(12) United States Patent
Yao et al.

(10) Patent No.: US 6,373,594 B1
(45) Date of Patent: Apr. 16, 2002

(54) COLOR PRINTER HALFTONING METHOD AND APPARATUS

(75) Inventors: Meng Yao, Tigard; Stephen M. Kroon, Sherwood, both of OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/222,038

(22) Filed: Dec. 29, 1998

(51) Int. Cl.$^7$ ................................................. B41J 2/205
(52) U.S. Cl. ........................................ 358/1.9; 382/237
(58) Field of Search .......................... 358/1.9, 534–536, 358/456–460, 429, 298; 382/237, 270

(56) References Cited

U.S. PATENT DOCUMENTS

| | | | | | |
|---|---|---|---|---|---|
| 5,268,772 A | * | 12/1993 | Ikuta | ............................ | 358/456 |
| 5,946,450 A | * | 8/1999 | Ebner et al. | .................. | 358/1.9 |
| 6,014,226 A | * | 1/2000 | Harrington et al. | .......... | 358/1.9 |
| 6,250,733 B1 | * | 6/2001 | Yao et al. | ...................... | 347/15 |

OTHER PUBLICATIONS

U.S. patent application No. 09/198,0247, Meng Yao, et al. "Color Printer Halftoning Method", 27 pages (now US Patent 6250733).

\* cited by examiner

*Primary Examiner*—Thomas D. Lee
*Assistant Examiner*—Stephen Brinich

(57) ABSTRACT

A color printing system with a data storage medium containing a first data set corresponding to a first halftone screen having a first screen matrix of threshold values. The first screen matrix has screen locations corresponding to the matrix of image data elements, and each screen location has a threshold value selected from a range of threshold values. The data storage medium includes a second data set corresponding to an second halftone screen having a second screen matrix of threshold values, each inversely related to the corresponding threshold value of the first screen. The data storage medium includes a third data set corresponding to a third halftone screen having a third screen matrix of threshold values each based on a difference between the first screen value for the corresponding location and a preselected intermediate value in the range of threshold values.

19 Claims, 6 Drawing Sheets

ORIGINAL SCREEN

INVERTED SCREEN

10

| 184 | 11 | 224 | 51 | 252 | 17 | 114 | 241 | 128 | 79 | 22 | 140 | 57 | 215 | 160 | 49 |
|---|---|---|---|---|---|---|---|---|---|---|---|---|---|---|---|
| 236 | 69 | 133 | 107 | 170 | 70 | 196 | 38 | 155 | 191 | 228 | 90 | 185 | 104 | 27 | 86 |
| 115 | 163 | 40 | 209 | 2 | 142 | 96 | 220 | 73 | 119 | 55 | 162 | 13 | 254 | 141 | 208 |
| 8 | 187 | 244 | 81 | 183 | 238 | 29 | 171 | 12 | 246 | 35 | 205 | 126 | 43 | 177 | 61 |
| 145 | 101 | 23 | 154 | 116 | 52 | 137 | 201 | 103 | 147 | 181 | 85 | 230 | 76 | 111 | 239 |
| 44 | 217 | 63 | 229 | 32 | 210 | 92 | 59 | 225 | 66 | 123 | 9 | 151 | 212 | 16 | 194 |
| 82 | 122 | 178 | 132 | 74 | 172 | 253 | 5 | 165 | 42 | 240 | 199 | 98 | 50 | 130 | 159 |
| 30 | 251 | 3 | 202 | 106 | 18 | 143 | 113 | 197 | 138 | 78 | 33 | 175 | 247 | 65 | 222 |
| 169 | 88 | 152 | 46 | 237 | 189 | 67 | 219 | 25 | 105 | 214 | 156 | 121 | 4 | 186 | 109 |
| 203 | 53 | 221 | 124 | 77 | 158 | 39 | 95 | 168 | 245 | 14 | 68 | 233 | 93 | 148 | 20 |
| 97 | 136 | 15 | 176 | 34 | 213 | 135 | 234 | 45 | 87 | 146 | 193 | 37 | 207 | 48 | 243 |
| 60 | 232 | 192 | 94 | 250 | 108 | 0 | 190 | 125 | 206 | 58 | 112 | 164 | 83 | 131 | 179 |
| 1 | 157 | 72 | 26 | 153 | 54 | 166 | 75 | 21 | 161 | 226 | 10 | 255 | 24 | 223 | 117 |
| 91 | 211 | 127 | 235 | 118 | 200 | 227 | 100 | 248 | 47 | 134 | 182 | 99 | 149 | 56 | 195 |
| 249 | 62 | 19 | 180 | 41 | 84 | 28 | 144 | 188 | 110 | 71 | 36 | 204 | 80 | 174 | 31 |
| 102 | 150 | 198 | 89 | 139 | 216 | 173 | 64 | 6 | 218 | 167 | 242 | 120 | 7 | 231 | 129 |

ORIGINAL SCREEN

| 71 | 244 | 31 | 204 | 3 | 238 | 141 | 14 | 127 | 176 | 233 | 115 | 198 | 40 | 95 | 206 |
|---|---|---|---|---|---|---|---|---|---|---|---|---|---|---|---|
| 19 | 186 | 122 | 148 | 85 | 185 | 59 | 217 | 100 | 64 | 27 | 165 | 70 | 151 | 228 | 169 |
| 140 | 92 | 215 | 46 | 253 | 113 | 159 | 35 | 182 | 136 | 200 | 93 | 242 | 1 | 114 | 47 |
| 247 | 68 | 11 | 174 | 72 | 17 | 226 | 84 | 243 | 9 | 220 | 50 | 129 | 212 | 78 | 194 |
| 110 | 154 | 232 | 101 | 139 | 203 | 118 | 54 | 152 | 108 | 74 | 170 | 25 | 179 | 144 | 16 |
| 211 | 38 | 192 | 26 | 223 | 45 | 163 | 196 | 30 | 189 | 132 | 246 | 104 | 43 | 239 | 61 |
| 173 | 133 | 77 | 123 | 181 | 83 | 2 | 250 | 90 | 213 | 15 | 56 | 157 | 205 | 125 | 96 |
| 225 | 4 | 252 | 53 | 149 | 237 | 112 | 142 | 58 | 117 | 177 | 222 | 80 | 8 | 190 | 33 |
| 86 | 167 | 103 | 209 | 18 | 66 | 188 | 36 | 230 | 150 | 41 | 99 | 134 | 251 | 69 | 146 |
| 52 | 202 | 34 | 131 | 178 | 97 | 216 | 160 | 87 | 10 | 241 | 187 | 22 | 162 | 107 | 235 |
| 158 | 119 | 240 | 79 | 221 | 42 | 120 | 21 | 210 | 168 | 109 | 62 | 218 | 48 | 207 | 12 |
| 195 | 23 | 63 | 161 | 5 | 147 | 255 | 65 | 130 | 49 | 197 | 143 | 91 | 172 | 124 | 76 |
| 254 | 98 | 183 | 229 | 102 | 201 | 89 | 180 | 234 | 94 | 29 | 245 | 0 | 231 | 32 | 138 |
| 164 | 44 | 128 | 20 | 137 | 55 | 28 | 155 | 7 | 208 | 121 | 73 | 156 | 106 | 199 | 60 |
| 6 | 193 | 236 | 75 | 214 | 171 | 227 | 111 | 67 | 145 | 184 | 219 | 51 | 175 | 81 | 224 |
| 153 | 105 | 57 | 166 | 116 | 39 | 82 | 191 | 249 | 37 | 88 | 13 | 135 | 248 | 24 | 126 |

INVERTED SCREEN

| 112 | 233 | 192 | 153 | 248 | 221 | 27  | 226 | 0   | 97  | 211 | 24  | 141 | 174 | 64  | 157 |
|-----|-----|-----|-----|-----|-----|-----|-----|-----|-----|-----|-----|-----|-----|-----|-----|
| 216 | 117 | 10  | 41  | 84  | 115 | 136 | 179 | 54  | 126 | 200 | 75  | 114 | 47  | 201 | 83  |
| 25  | 70  | 175 | 162 | 251 | 28  | 63  | 184 | 109 | 17  | 145 | 68  | 229 | 252 | 26  | 160 |
| 239 | 118 | 232 | 93  | 110 | 220 | 197 | 86  | 231 | 236 | 185 | 154 | 3   | 169 | 98  | 133 |
| 34  | 53  | 209 | 52  | 23  | 151 | 18  | 146 | 49  | 38  | 106 | 85  | 204 | 103 | 33  | 222 |
| 167 | 178 | 129 | 202 | 191 | 164 | 71  | 137 | 194 | 123 | 9   | 237 | 46  | 168 | 223 | 132 |
| 91  | 11  | 100 | 8   | 107 | 88  | 250 | 245 | 74  | 171 | 224 | 142 | 59  | 155 | 4   | 62  |
| 195 | 246 | 249 | 148 | 43  | 219 | 30  | 29  | 138 | 20  | 99  | 189 | 94  | 238 | 125 | 188 |
| 82  | 79  | 48  | 163 | 218 | 122 | 121 | 182 | 205 | 45  | 172 | 56  | 13  | 247 | 116 | 37  |
| 150 | 149 | 186 | 7   | 101 | 60  | 177 | 65  | 80  | 234 | 227 | 119 | 210 | 69  | 40  | 215 |
| 61  | 16  | 225 | 96  | 187 | 170 | 14  | 212 | 165 | 81  | 36  | 130 | 181 | 158 | 159 | 230 |
| 135 | 208 | 128 | 67  | 244 | 39  | 255 | 124 | 5   | 156 | 139 | 31  | 72  | 89  | 6   | 102 |
| 253 | 58  | 111 | 203 | 50  | 147 | 76  | 105 | 213 | 66  | 196 | 235 | 254 | 207 | 190 | 21  |
| 73  | 166 | 1   | 214 | 19  | 144 | 198 | 55  | 240 | 161 | 12  | 108 | 57  | 42  | 143 | 134 |
| 242 | 131 | 217 | 104 | 173 | 87  | 199 | 32  | 120 | 35  | 113 | 183 | 152 | 95  | 92  | 193 |
| 51  | 44  | 140 | 77  | 22  | 176 | 90  | 127 | 243 | 180 | 78  | 228 | 15  | 241 | 206 | 2   |

THIRD SCREEN

*FIG. 3*

| 184 | 11 C | 224 | 51 | 252 M | 17 C | 114 | 241 M | 128 Y | 79 | 22 C | 140 Y | 57 | 215 | 160 | 49 |
|---|---|---|---|---|---|---|---|---|---|---|---|---|---|---|---|
| 236 M | 69 | 133 Y | 107 | 170 | 70 | 196 | 38 | 155 | 191 | 228 | 90 | 185 | 104 | 27 | 86 |
| 115 | 163 | 40 | 209 | 2 C | 142 | 96 | 220 | 73 | 119 Y | 55 | 162 | 13 C | 254 M | 141 | 208 |
| 8 C | 187 | 244 M | 81 | 183 | 238 M | 29 | 171 | 12 C | 246 M | 35 | 205 | 126 Y | 43 | 177 | 61 |
| 145 | 101 | 23 C | 154 | 116 Y | 52 | 137 Y | 201 | 103 | 147 | 181 | 85 | 230 | 76 | 111 | 239 M |
| 44 | 217 | 63 | 229 | 32 | 210 | 92 | 59 | 225 | 66 | 123 Y | 9 C | 151 | 212 | 16 C | 194 |
| 82 | 122 Y | 178 | 132 Y | 74 | 172 | 253 M | 5 C | 165 | 42 | 240 M | 199 | 98 | 50 | 130 Y | 159 |
| 30 | 251 M | 3 C | 202 | 106 | 18 C | 143 | 113 | 197 | 138 Y | 78 | 33 | 175 | 247 M | 65 | 222 |
| 169 | 88 | 152 | 46 | 237 M | 189 | 67 | 219 | 25 | 105 | 214 | 156 | 121 Y | 4 C | 186 | 109 |
| 203 | 53 | 221 | 124 Y | 77 | 158 | 39 | 95 | 168 | 245 M | 14 C | 68 | 233 M | 93 | 148 | 20 C |
| 97 | 136 Y | 15 C | 176 | 34 | 213 | 135 Y | 234 M | 45 | 87 | 146 | 193 | 37 | 207 | 48 | 243 M |
| 60 | 232 M | 192 | 94 | 250 M | 108 | 0 C | 190 | 125 Y | 206 | 58 | 112 | 164 | 83 | 131 Y | 179 |
| 1 C | 157 | 72 | 26 | 153 | 54 | 166 | 75 | 21 C | 161 | 226 | 10 C | 255 M | 24 C | 223 | 117 Y |
| 91 | 211 | 127 Y | 235 M | 118 Y | 200 | 227 | 100 | 248 M | 47 | 134 Y | 182 | 99 | 149 | 56 | 195 |
| 249 M | 62 | 19 C | 180 | 41 | 84 | 28 | 144 | 188 | 110 | 71 | 36 | 204 | 80 | 174 | 31 |
| 102 | 150 | 198 | 89 | 139 Y | 216 | 173 | 64 | 6 C | 218 | 167 | 242 M | 120 Y | 7 C | 231 M | 129 Y |

ORIGINAL SCREEN

| 184 M | 11 C | 224 M | 51 C | 252 M | 17 C | 114 K | 241 M | 128 K | 79 CM | 22 C | 140 K | 57 C | 215 M | 160 CM | 49 C |
|---|---|---|---|---|---|---|---|---|---|---|---|---|---|---|---|
| 236 M | 69 C | 133 K | 107 K | 170 CM | 70 C | 196 M | 38 C | 155 CM | 191 M | 228 M | 90 CM | 185 M | 104 K | 27 C | 86 CM |
| 115 K | 163 CM | 40 C | 209 M | 2 C | 142 K | 96 CM | 220 M | 73 C | 119 K | 55 C | 162 CM | 13 C | 254 M | 141 K | 208 M |
| 8 C | 187 M | 244 M | 81 CM | 183 M | 238 M | 29 C | 171 CM | 12 C | 246 M | 35 C | 205 M | 126 K | 43 C | 177 CM | 61 C |
| 145 K | 101 K | 23 C | 154 CM | 116 K | 52 C | 137 K | 201 M | 103 K | 147 K | 181 M | 85 CM | 230 M | 76 C | 111 K | 239 M |
| 44 C | 217 M | 63 C | 229 M | 32 C | 210 M | 92 CM | 59 C | 225 M | 66 C | 123 K | 9 C | 151 K | 212 M | 16 C | 194 M |
| 82 CM | 122 K | 178 CM | 132 K | 74 C | 172 CM | 253 M | 5 C | 165 CM | 42 C | 240 M | 199 M | 98 CM | 50 C | 130 K | 159 CM |
| 30 C | 251 M | 3 C | 202 M | 106 K | 18 C | 143 K | 113 K | 197 M | 138 K | 78 CM | 33 C | 175 CM | 247 M | 65 C | 222 M |
| 169 CM | 88 CM | 152 K | 46 C | 237 M | 189 M | 67 C | 219 M | 25 C | 105 K | 214 M | 156 CM | 121 K | 4 C | 186 M | 109 K |
| 203 M | 53 C | 221 M | 124 K | 77 CM | 158 CM | 39 C | 95 CM | 168 CM | 245 M | 14 C | 68 C | 233 M | 93 CM | 148 K | 20 C |
| 97 CM | 136 K | 15 C | 176 CM | 34 C | 213 M | 135 K | 234 M | 45 C | 87 CM | 146 K | 193 M | 37 C | 207 M | 48 C | 243 M |
| 60 C | 232 M | 192 M | 94 CM | 250 M | 108 K | 0 C | 190 M | 125 K | 206 M | 58 C | 112 K | 164 CM | 83 CM | 131 K | 179 M |
| 1 C | 157 CM | 72 CM | 26 C | 153 K | 54 C | 166 CM | 75 C | 21 C | 161 CM | 226 M | 10 C | 255 M | 24 C | 223 M | 117 K |
| 91 CM | 211 M | 127 K | 235 M | 118 K | 200 M | 227 M | 100 CM | 248 M | 47 C | 134 K | 182 M | 99 CM | 149 K | 56 C | 195 M |
| 249 M | 62 C | 19 C | 180 M | 41 C | 84 CM | 28 C | 144 K | 188 M | 110 K | 71 C | 36 C | 204 M | 80 CM | 174 CM | 31 C |
| 102 K | 150 K | 198 M | 89 CM | 139 K | 216 M | 173 CM | 64 C | 6 C | 218 M | 167 CM | 242 M | 120 K | 7 C | 231 M | 129 K |

ORIGINAL SCREEN

FIG. 5C

COLOR PRINTER HALFTONING METHOD AND APPARATUS

BACKGROUND OF THE INVENTION

This invention relates generally to color printing, and more particularly to a method for halftoning color images.

Color printing uses a halftoning process to convert continuous tone images to a printable format. For instance, 24 bit/pixel continuous tone image data may be converted into 3 or 4 bit/pixel print data. This allows the use of printing technology that imprints ink in fixed quanta (i.e. one or two droplets per pixel.) With only a few actual colors being printable, the perception of a multitude of color tones is created by the combination of adjacent printed pixels.

Halftoning may also be used for non-printed images, such as those displayed on certain computer screens having pixels unable to display a continuous brightness range.

Halftoning may employ a screen having a matrix of different threshold values. A screen is a data set with each different possible print density value equally represented (or with a controlled unequal distribution for gamma-compensated screens). For monochrome printing, the image data is compared with the screen thresholds at each position, and if the image data exceeds the threshold, a dot is printed; if not, the location remains unprinted. Improved appearance is provided using a pseudo-random stochastic screen having a "blue noise" characteristic. Such screens have the threshold values distributed so that adjacent values tend to be very different, and so that any value or limited range of values will tend to be located at positions that are nicely spaced apart on the matrix, avoiding clumping. For example, a 16-by-16 pixel screen having threshold values In the range of 0–255 may be used. This apparently even-butrandom spacing is particularly emphasized at the extremely low and high density values in a blue noise screen.

For color printing, halftoning presents a particular challenge. For dot-on-dot printing, in which printed locations are printed with one or more dots, while nearby pixels are unprinted, a single halftoning screen may be used. For instance, a field of 10% blue would have 10% of locations printed with cyan and magenta ink, while 90% of locations are unprinted. This has the disadvantage of reduced spatial frequency with respect to methods that distribute dots to different locations, and gives the appearance of darker dots, more widely spaced apart, or a "grainy" image. The same applies for clustered dot printing techniques, in which different color dots may be printed adjacent to each other or otherwise clustered to create a multi-dot cluster that reads as an intermediate color. Accordingly, it is preferable to print the individual dots at spaced-apart separate locations, relying on the viewer's eye to integrate the different color dots into the intended color.

By using different screens having the threshold values arranged differently, the dots will tend not to align with each other. However, with uncorrelated screens, the printed patterns of different colors will tend to be randomly located with respect to each other, leading to some graininess of the image as some dots happen to clump near others or overlap. With two colors, to reduce this, an "inverted screen" is used for one of the colors An inverted screen has values equal to the difference between the maximum screen value, and the screen value at the corresponding location on the other screen. Thus, for example, 10% blue is printed by printing cyan dots at all locations where the threshold values of the original screen are 25 or less, and magenta dots at locations of values of 230 and above on the original screen (25 or less on an inverted screen).

Inverted screens are limited in usefulness for high quality printing with 3 or more colors, as color printing normally requires. The third and possibly fourth colors typically must be printed by other means that can generate low frequency visible artifacts. For three and four color systems, a shifted screen approach has been employed to avoid pure dot-on-dot printing for some colors. Not only does this lead to increased graininess of the image, but it often generates unwanted low frequency artifacts that are visible in the printed image. It is also believed possible that moire patterns may be generated.

A more sophisticated halftoning approach for high quality printing of more than two colors has been disclosed in U.S. patent application No. 09/198,024, filed Nov. 23, 1998, to Yao et al., entitled "Color Printer Halftoning Method," the disclosure of which is incorporated herein by reference. While this is effective for very high quality four color printing, it requires significant processing resources to be devoted to the calculations required for halftoning each image.

Accordingly, there is a need for a halftoning process for printing systems employing three or more colors that provides an evenly dispersed pattern of individual drops of different colors, and in which the droplets are dispersed in a high frequency pattern that minimizes unwanted visible image artifacts. In addition, there is a need for a system that does not require significant processor resources for printing.

The present invention overcomes these disadvantages by providing a method of halftoning a color image and particularly by providing a color printing system with a data storage medium containing first, second and third data sets corresponding to first, second and third halftone screens, respectively, having first, second and third screen matrices of threshold values.

SUMMARY OF THE INVENTION

The present invention provides a method of halftoning a color image and particularly provides a color printing system with a data storage medium containing a first data set corresponding to a first halftone screen having a first screen matrix of threshold values. The first screen matrix has screen locations corresponding to the matrix of image data elements, and each screen location has a threshold value selected from a range of threshold values. The data storage medium includes a second data set corresponding to a second halftone screen having a second screen matrix of threshold values, each inversely related to the corresponding threshold value of the first screen. The data storage medium includes a third data set corresponding to a third halftone screen having a third screen matrix of threshold values each based on a difference between the first screen value for the corresponding location and a preselected intermediate value in the range of threshold values.

It is a feature of the present invention that the method can employ a halftone screen and its inverted screen for either the cyan or magenta colors and a third screen for yellow that is medially centered with respect to the first screen.

BRIEF DESCRIPTION OF THE SEVERAL VIEWS OF THE DRAWING

These and other aspects, features and advantages of the invention will become apparent upon consideration of the following detailed disclosure of the invention, especially when it is taken in conjunction with the accompanying views of the drawing wherein:

FIG. 1 is a symbolic view of a first halftoning screen according to a preferred embodiment of the invention.

FIG. 2 is a symbolic view of a second halftoning screen according to a preferred embodiment of the invention, based on the screen of FIG. 1.

FIG. 3 is a symbolic view of a third halftoning screen according to a preferred embodiment of the invention, based on the screen of FIG. 1.

FIGS. 5a, 5b, and 5c are symbolic views of a second example color printing employing the screens of FIGS. 1, 2, and 3, using a four-colorant system.

DETAILED DESCRIPTION OF THE INVENTION

Figures 4A, 4B:
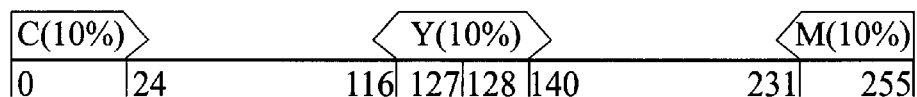
FIGS. 4a and 4b are symbolic views of a first example of three color printing employing the screens of FIGS. 1, 2, and 3.

FIG. 1 shows an exemplary blue noise stochastic halftoning screen 10 in symbolic form as a grid having assorted numerical threshold values. In practice, the screen is stored as a set of data in a memory device of a printer or a computer connected to a printer. The screen is a 16-by-16 element matrix having one of each value from 0 through 255. In the preferred embodiment, a larger screen of 128-by-128 elements is used to reduce the possibility that screen-generated patterns will appear visible, generating an unwanted tiling effect. In those stochastic screens that have not been gamma-compensated, each value in the to entire range is represented as often as each of the other values, so that a randomly selected location on the matrix is equally likely to be any of the threshold values. However, the values are not entirely random. With a blue noise screen, values are carefully distributed to reduce the chances that numerically close values will appear at spatially close locations on the screen. Put another way, a limited range of values (dots) will tend to be widely distributed about the screen, with fairly even but not regular spacing between adjacent dots.

FIG. 2 shows a second halftoning screen 20 that is an "inverted screen" based on the first screen 10. This means that the screen is a similar matrix of values from the same range, but with each value being calculated as the difference between the maximum value of the range, and the corresponding screen value of the first screen at the corresponding location. In this example with a range of 0–255 for screen values, each inverted value will be set equal to 255 minus the first screen value:

(second screen value)=255−(first screen value).

FIG. 3 shows a third screen 30 having a matrix of screen locations corresponding to those of the first screen. Each third screen value is based on a function of the corresponding first screen value. The third screen is a medially-centered screen, with the third screen values being proportional to their difference from a medial or intermediate value of the range of values. In the preferred embodiment, the medial value is the median of the range (128 in the Illustrated example), although in alternative embodiments, the medial value may depart from the median to compensate for any particular characteristics of a printer or display output. The function for calculating the third screen values assigns a value to each location based on double the absolute value of the difference between the corresponding first screen value and the medial value. In the preferred embodiment, this is expressed as:

if (first screen value)>(medial value), then set (third screen value)=2×[(first screen value)−(medial value)]else set (third screen value)={2×[(medial value)−(first screen value)]}−1.

Thus, the third screen values start at zero at the medial value, and increase in both directions until they reach the maximum screen value at the extreme highest and lowest first screen values. This provides a continuous segment of third color printing centered on the median value. In the illustrated embodiment, the third screen value is 0 where the first screen value is 128, 1 where the first screen value is 127, with the third screen values counting upward by even numbers as the first screen values increase above 128, and counting upward by odd numbers as the first screen values decrease below 127, until the third screen values of 254 and 255 are reached at the locations corresponding to the first screen values of 255 and 0, respectively.

The three halftoning screens may be generated prior to any image data processing, displaying, or printing. For example, they may be embodied in:

1. Application software such as image processing and editing software,
2. Operating systems having image processing capabilities,
3. Printer or display driver software,
4. Video image processing software,
5. Media storing any such software,
6. Hardware such as memory storage chips in printers, computers, monitors, or other image display or generation devices, or
7. Any other device or source for image generation. The preferred embodiment will be discussed with reference to an ink jet printer having three or four different colorants for generating a color image on a sheet of printer media. In the preferred embodiment, these are Cyan (C), Magenta (M), Yellow (Y), and (optionally) Black (K) inks. In alternative embodiments, different ink colors may be used, and in emissive displays where halftoning is employed, Red, Blue Green (RGB) colors may be used. (An emissive display, for example, can have the ability to display only binary or other limited gradient display states for each color at each location, or have a limited number of different possible color outputs per pixel, relative to what the eye can discern.)

Each halftone screen corresponds to one of the ink (or display output) colors from the set of three colors. In the preferred embodiment, these are the CMY colors, with the first screen handling Cyan, the second screen handling Magenta, and the third screen handling Yellow. Because stochastic halftoning screens generally have best distributions of extreme values, and less well distributed intermediate values, the lightest, least visible color (Yellow, against a white media sheet) is selected to be represented by the third screen, which will rely on these intermediate value locations. In RGB systems, the least visible color is usually blue, and can be assigned to be halftoned by the medially-centered screen. The medially-centered color may also be selected for other reasons, such as if one color is more desirable for gray replacement in a four ink system, as will be discussed below. In a display employing RGB LED's and a white light source for each pixel, there may be advantages to reducing usage of less efficient or more expensive blue LED's when possible, and thus selecting that color to be medially-centered and more likely to be white-replaced.

Before halftoning proceeds, any original image data must be converted (if not already) to a three color system (e.g. CMY, RGB). The converted data will be set to fall within a range of values the same as the range of screen threshold values. Each of the three colors is halftoned by processing the converted data pixel-by-pixel, in conjunction with the screen associated with that color. Processing proceeds by comparing the converted data for each pixel with the screen threshold value of the corresponding location on the appropriate screen. If the data value exceeds the threshold value, that color is printed or displayed at that location (or a print or display data file is created with an instruction to print or display that color—but which may be stored, spooled, buffered, or further processed before display or printing occurs.)

FIGS. 4a and 4b show an example of 10% gray printing, generated by converting the image data to three-color 10% cyan, 10% magenta, and 10% yellow. The screen illustrated is the original screen 10 for reference, while the magenta and yellow data has been halftoned using the respective screens 20 and 30. Cyan droplets have been printed to locations where screen values are at 0–24; yellow droplets have been printed to locations where screen values are at 116–140 (0–24 on the medially-centered screen 20); magenta droplets have been printed to locations where screen values are at 231–255 (0–24 on the inverted screen.) As the symbolic distribution bars for each color in FIG. 4a do not overlap, it is ensured that none of the different color droplets are printed to common locations. Accordingly, a finer pattern is formed with higher spatial frequency, as compared with printing only black droplets, or printing the color droplets with shifted screens or other processor-efficient techniques.

Figure 5A:
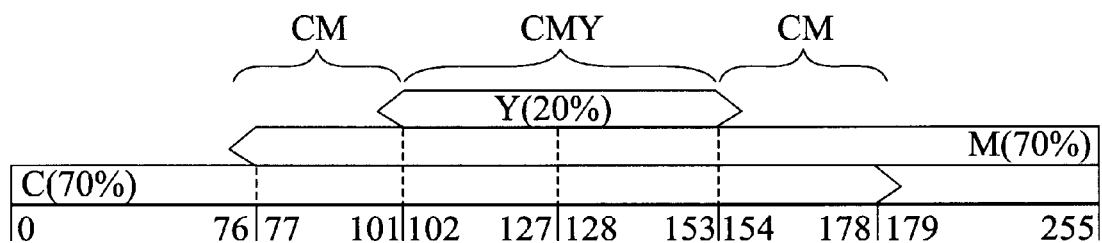
Figure 5B:
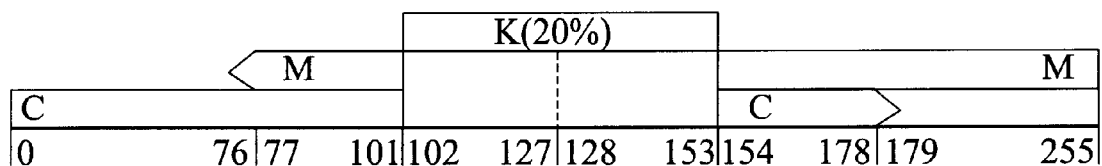

FIGS. 5a, 5b, and 5c illustrate a second example in which a denser color is printed, in this case a dark grayish blue generated from 70% cyan, 70% magenta, and 20% yellow. After the image data is converted to (or provided in) the three color CMY format, it is distributed as shown with the color bars overlapping at certain values. In this example, all locations are covered by at least one droplet, and locations having values where two or more color bars overlap are printed with droplets from those colors.

In systems in which four ink colors are provided, or where otherwise desirable, the domain where all three colors (CMY) overlap may be replaced with a black droplet. This gray replacement procedure conserves ink resources, and provides a denser, blacker black printed image. (analogously, a RGB display might be provided with the option of a white pixel to replace simultaneously illuminated RGB elements of a color pixel.) Gray replacement will only occur when all three colors overlap. When gray replacement is to be employed, the halftoning process will generate a print data file or portion thereof, which will then be processed for gray replacement prior to printing or displaying.

In this example, single cyan droplets are printed to locations having threshold values (on the original screen) of 0–76, both cyan and magenta droplets are printed to locations having threshold values of 77–101 and 154–178, single black droplets (or C, M and Y droplets in a three color printer) are printed to locations having threshold values of 102–153, and single magenta droplets are printed to locations having threshold values of 179–255. Although the black droplet locations are at the less than ideally distributed middle range of the original halftoning screen, any mild unevenness of distribution is well concealed by the fact that all other locations are printed with at least one of the cyan or magenta droplets.

While the invention has been described above with references to specific embodiments thereof, it is apparent that many changes, modifications and variations in the materials, arrangements of parts and steps can be made without departing from the inventive concept disclosed herein. For example, it should be noted that while the Invention has been described in terms of developing the third halftone screen by medial growth or medial centering with 256 levels, it may be preferable to use a higher resolution screen employing more than 256 levels, such as 512 levels, to generate the third halftone screen to obtain improved image appearance. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A method of halftoning a color image having a matrix of image data elements comprising the steps:

providing a first halftone screen having a first screen matrix of threshold values, the first screen matrix having screen locations corresponding to the matrix of image data elements, each screen location having a threshold value selected from a range of threshold values;

generating a second halftone screen having a second screen matrix of threshold values each inversely related to the corresponding threshold value of the first screen; and generating a third halftone screen having a third screen matrix of threshold values each functionally related to the corresponding threshold value of the first screen, with the lowest values of the third screen being assigned to locations corresponding to locations of the first screen having intermediate threshold values, and the highest values of the third screen being assigned to locations corresponding to locations of the first screen having lowest and highest threshold values.

2. The method of claim 1 including the steps of providing image data and converting the image data to three color values for each location, each color value associated with a different output color.

3. The method of claim 2 wherein the output colors comprise cyan, magenta, and yellow colorants.

4. The method of claim 2 including associating a different screen with each different color, and for each location, comparing the color value with the threshold value of the associated screen to determine whether to print the associated output color to the selected location.

5. The method of claim 4 including printing the output color if the color value exceeds the threshold value.

6. The method of claim 4 including for each location, determining if all three color values exceed their associated screen threshold values, and if so, determining to print black colorant at the selected location.

7. The method of claim 1 wherein generating the third halftone screen includes for each location, assigning a value based on a difference between the first screen value for the corresponding location and a preselected intermediate value in the range of threshold values.

8. The method of claim 1 wherein generating the second halftone screen includes setting each second screen value equal to the difference between the maximum value in the range, and the corresponding first screen value.

9. A color printing system comprising:

a data storage medium;

a first data set corresponding to a first halftone screen having a first screen matrix of threshold values, the first screen matrix having screen locations corresponding to the matrix of image data elements, each screen location having a threshold value selected from a range of threshold values;

a second data set corresponding to a second halftone screen having a second screen matrix of threshold values each inversely related to the corresponding threshold value of the first screen; and a third data set corresponding to a third halftone screen having a third screen matrix of threshold values each based on a difference between the first screen value for the corresponding location and a preselected intermediate value in the range of threshold values.

10. The system of claim 9 including:

an input operably connected to a data source to receive a set of image data;

a processor operably connected to the data storage medium and to the input, and having an output; and a multi-color printing engine connected to the processor.

11. The system of claim 9 wherein the printing engine includes at least three different colorants.

12. The system of claim 9, further comprising:

means for comparing a first color value to a threshold value of said first halftone screen, means for comparing a second color value to a threshold value of said second halftone screen, means for comparing a third color value to a threshold value of said third halftone screen, means for printing a black colorant if all three of these comparisons indicate a color value greater than the corresponding threshold value.

13. The system of claim 9 wherein each second screen value of the second halftone screen is equal to the difference between the maximum value in the range, and the corresponding first screen value.

14. A method of printing a color image having a matrix of image data elements, onto a media sheet, the method comprising the steps:

providing a first halftone screen having a first screen matrix of threshold values, the first screen matrix having screen locations corresponding to the matrix of image data elements, each screen location having a threshold value selected from a range of threshold values;

providing a second halftone screen having a second screen matrix of threshold values each inversely related to the corresponding threshold value of the first screen; and providing a third halftone screen having a third screen matrix of threshold values each based on a difference between the first screen value for the corresponding location and a preselected intermediate value in the range of threshold values;

associating a different screen with each of least three different colorant colors, and for each location, comparing the color value with the threshold value of the associated screen to determine whether to print the associated output color to the selected location.

15. The method of claim 14 including the steps of providing image data and converting the image data to three color values for each location, each color value associated with a different output color.

16. The method of claim 14 wherein the output colors comprise cyan, magenta, and yellow colorants.

17. The method of claim 14 including printing the output color if the color value exceeds the threshold value.

18. The method of claim 14, further comprising:

comparing a first color value to a threshold value of said first halftone screen, comparing a second color value to a threshold value of said second halftone screen, comparing a third color value to a threshold value of said third halftone screen, printing a colorant different from any of the first, second, and third colors if all three of these comparisons indicate a color value greater than the corresponding threshold value.

19. The method of claim 14 wherein generating the second halftone screen includes setting each second screen value equal to the difference between the maximum value in the range, and the corresponding first screen value.

* * * * *